United States Patent [19]

Huang

[11] Patent Number: 5,033,296

[45] Date of Patent: Jul. 23, 1991

[54] PRESSURE GAUGE

[76] Inventor: Tien-Tsai Huang, No. 4, Lane 30, Wu-Chang St., Pan-Chiao City, Taiwan

[21] Appl. No.: 533,891

[22] Filed: Jun. 6, 1990

[51] Int. Cl.[5] ............................................. B60C 23/02
[52] U.S. Cl. ...................................... 73/146.8; 73/744
[58] Field of Search .................... 73/146.8, 744, 146.3; 137/227, 228, 229

[56] References Cited

U.S. PATENT DOCUMENTS 1,930,039  10/1933  Crowley ............................... 73/744
3,019,657   2/1962  Mazeika ............................... 73/744

Primary Examiner—Donald O. Woodiel
Attorney, Agent, or Firm—Christensen O'Connor Johnson & Kindness

[57] ABSTRACT

A pressure gauge for measuring the pressure of a tire includes a hollow cylinder tube having two open ends and two flange portions one at each side of the ends; a spout portion having a passage within being connected to the cylinder tube; a pair of sealing plates having holes therethrough, being disposed on the cylinder tube; an elongated rod having two opposite ends and two tip portions extending axially from the ends. Each of the ends has an outer rim and the tip portion respectively protruding through the holes in the sealing plates. The elongated rod is movably fitted between the sealing plates and inside the cylinder tube. A pair of pressing members is disposed at the open ends of the cylinder tube to form seals. A sensing member is connected to the spout portion.

4 Claims, 3 Drawing Sheets

PRESSURE GAUGE

THE BACKGROUND OF THE INVENTION

The present invention relates to a pressure gauge, and more particularly to a pressure gauge with two detecting heads.

FIG. 1A is a partially sectional view of a prior art example of a pressure gauge with two detecting heads and FIG. 1B is a partially enlarged view of a preferred embodiment of the same pressure gauge. According to the prior art, a pressure gauge with two detecting heads for measuring the pressure of a tire includes a hollow cylinder tube A having passage a1 therein and an annular projection G which has two opposite ends, each provided with an annular thin protrusion T; a spout portion H having a passage a2 therein, connected to the hollow cylinder tube A; a sensing member F connected by threads to the spout portion H; a pair of sealing plates D1 and D2 having a circular shape with holes D11 and D21 in the middle of the plates and respectively disposed on the protrusion T; an elongated rod B having two opposite ends and tip portions C1 and C2, respectively and movably fitted on the open ends of the hollow cylinder tube and between the pair of sealing plates, the diameter of the holes D11 and D21 being smaller than the diameter of the elongated rod B. A pair of pressing member E1 and E2 having a circular shape and having holes therethrough is attached by threads to the cylinder tube A, one on each side. When in use, pressurized gas enters the apparatus through the tip portion C1, forcing the elongated rod B to one side, thus blocking the hole D11. The pressurized gas will pass through another hole D21 through the passage a1 and then to the passage a2 of the spout portion H and to the sensing member F. In this way one can measure the pressure of a tire.

But there are some drawbacks to the prior art device. First, the protrusion T in the prior art is very thin. To produce such an annular thin protrusion with a horizontal surface, requires very high precision in the manufacturing process. Poor machining of this one difficult to produce part however, results in inaccuracy in measuring the pressure of a tire. Second, if the protrusion is made a bit thicker, a higher pressure will be needed when engaging the pressing member and the cylinder tube. Third, the pressing member and the cylinder tube are connected by threads, as are the the spout portion and the sensing member, requiring additional labor, thus causing inconvenience and increasing the manufacturing cost.

SUMMARY OF THE INVENTION

It is therefore the main object of the present invention to provide a pressure gauge with two detecting heads with a simple construction and a low manufacturing cost. Another object of the invention is to prdvide a pressure gauge with two detecting heads that can be produced without assembling different parts beforehand and at the same time maintaining high accuracy in measuring the pressure of a tire. According to the present invention, a pressure gauge includes a hollow cylinder tube having two open ends; a spout portion having a passage therein, the spout portion being connected to the cylinder tube; a pair of sealing plates having holes therethrough, the plates being respectively mounted on the open ends of the cylinder tube; an elongated rod having two opposite ends and two protruded tip portions extending axially from the ends, each of the ends having an outer rim and the tip portion respectively protruding from the holes of the sealing plates, the elongated rod being movably fitted between the sealing plates inside the hollow cylinder tube; a pair of pressing members having holes therethrough fitted over the open ends of the cylinder tube in sleeve fashion forming a seal; a sensing member being connected to the spout portion.

BRIEF DESCRIPTION OF THE DRAWINGS

Other features and advantages of the present invention will become more apparent with reference to the accompanying drawing, in which.

DETAILED DESCRIPTION OF THE INVENTION

Figure 1A:
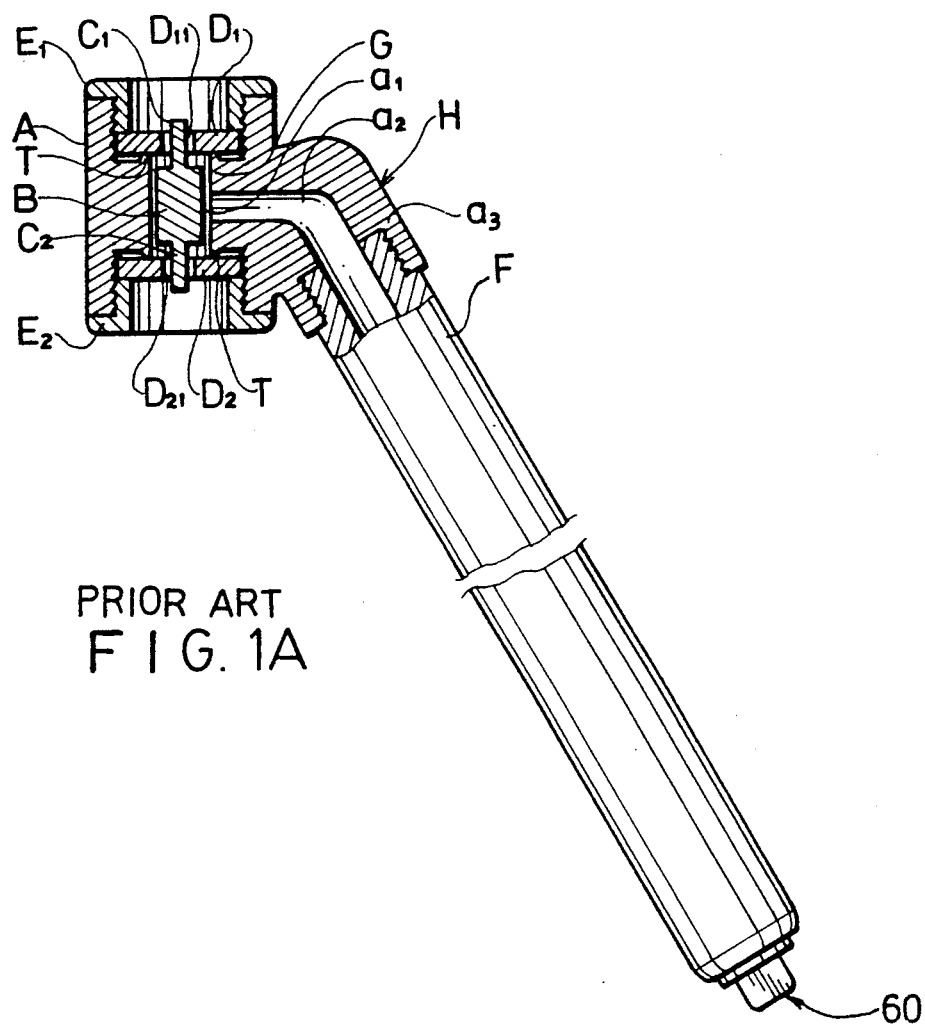
FIG. 1A is a partially sectional view of a pressure gauge of the prior art with two detecting heads.
Figure 1B:
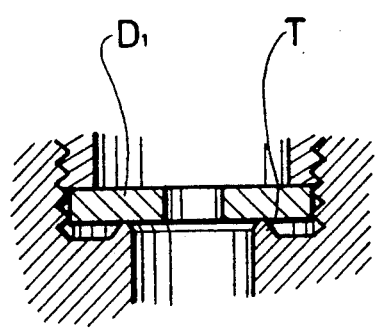
FIG. 1B is an enlarged view of a preferred embodiment of the pressure gauge of the prior art.
Figure 2:
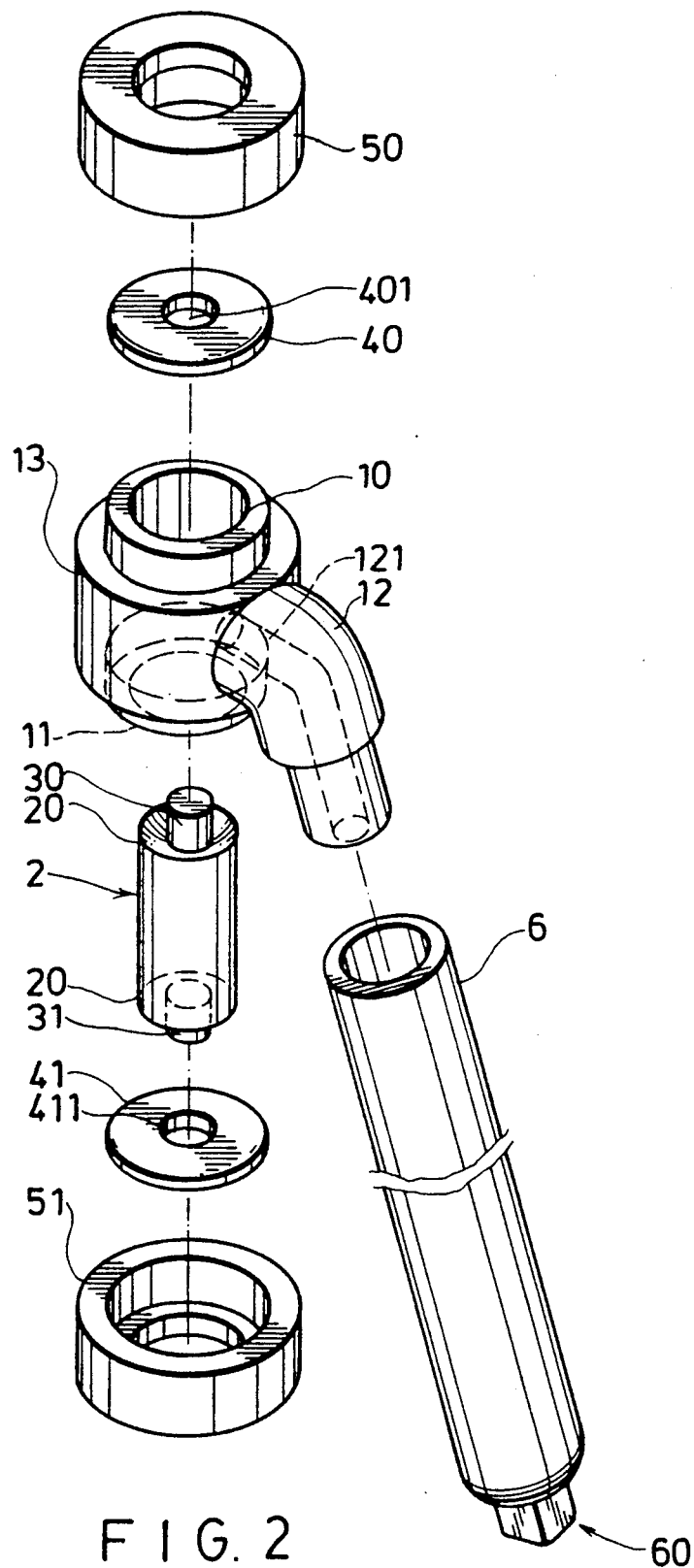
FIG. 2 is an exploded view of a pressure gauge according to the present invention.
Figure 3:
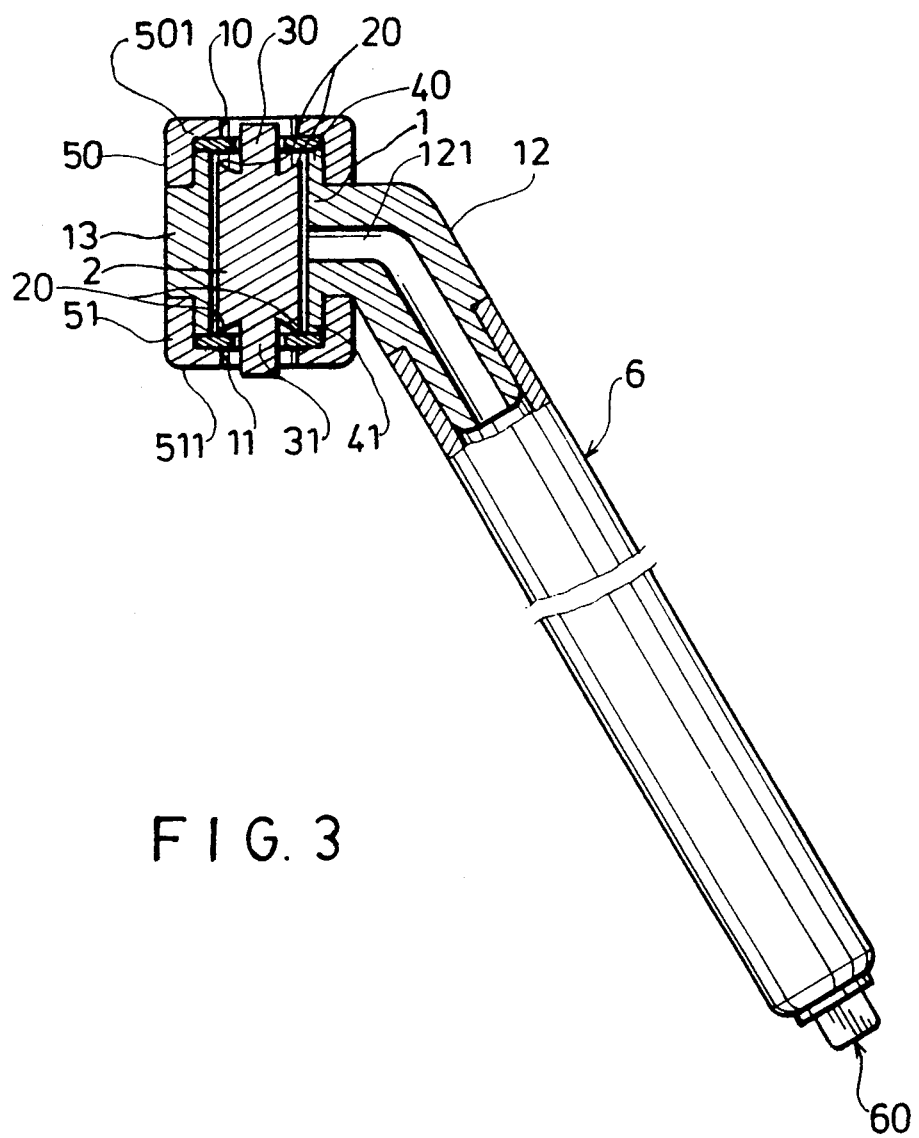
FIG. 3 is a partially sectional view of a pressure gauge of the present invention.

FIGS. 2 and 3 show a pressure gauge of the present invention. According to the present invention, a tire pressure gauge with two heads includes a hollow cylinder tube 13 having a pair of flange portions 10 and 11 one surrounding each open end of the tube; a spout portion 12 having a passage 121 therein is connected to and integrally formed with the cylinder tube 13; the spout portion 12 is fitted in the sensing member 6 in sleeve fashion; each of a pair of sealing plates 40 and 41 having holes 401 and 411 therethrough are respectively disposed on the open ends of the cylinder tube 13; an elongated rod 2 having two ends 20 and a pair of tip portions 30 and 31 respectively extending axially from the two ends, each of the ends having an outer rim and the tip portion respectively protruding from the holes of the sealing plates, the outer rim being connected to a concave portion surrounding the corresponding tip portion thus forming a continuous protrusion, said rod being movably disposed between the sealing plates inside the cylinder tube; a pair of pressing members 50 and 51 having holes therethrough respectively sleeved on the open ends of the cylinder tube. The sensing member 6 has a measuring scale 60 partially protruding therefrom. When applying one tip portion of the elongated rod to the valve of a tire, the pressure of the tire will push the elongated rod 2 causing the protrusion tightly to abut the sealing plates thus blocking the hole in the sealing plate opposite the protrusion in contact with the tire so that the pressurized gas, seeking equilibrium by the path of least resistance will escape into the spout portion 12 through passage 121, thus pushing the measuring scale 60 outward from the sensing member 6. One can easily discover the magnitude of the tire's air pressure simply by reading the valve indicated on that measuring scale.

With the present invention thus explained, it is obvious to those skilled in the art that several modifications and variations can be made without departing from the scope and spirit of the present invention. It is therefore, intended this invention be treated as indicated in the appended claims.

I claim:

1. A pressure gauge with two detecting heads for measuring the pressure of a tire, said gauge comprising:
   a hollow cylinder tube having two open ends;
   a spout portion having a passage therein, said spout portion being connected to said cylinder tube;
   a pair of sealing plates having holes therethrough, said plates being respectively mounted on said open end of said hollow cylinder tube;
   an elongated rod having two opposite ends and two protruded tip portions extending respectively and axially from said ends, each of said ends having an outer rim that is connected to a concave portion surrounding the said corresponding tip portion, each said outer rim, concave portion and being formed as a continuous protrusion, said tip portions respectively protruding through said holes of said sealing plates, said elongated rod being movably fitted between said plates inside said cylinder tube;
   a pair of pressing members having holes therethrough, sealingly sleeved on said open ends of said cylinder tube;
   a sensing member connected to said spout portion.

2. A pressure gauge as claimed in claim 1 wherein said protrusion is closely fitted in said sealing plates that it provides greater accuracy in measurement when gauging the pressure of a tire.

3. A pressure gauge as claimed in claim 1, wherein said cylinder tube has flange portions respectively formed around said open ends of said cylinder tube so that said sealing plates can be mounted thereon.

4. A pressure gauge as claimed in claim 1, wherein said spout portion and said sensing member are fitted together by means of a sleeve.

* * * * *